United States Patent
Yamashita et al.

(10) Patent No.: US 9,088,738 B2
(45) Date of Patent: Jul. 21, 2015

(54) SOLID-STATE IMAGE PICKUP DEVICE AND METHOD OF DRIVING THE SAME

(75) Inventors: Yuichiro Yamashita, Ebina (JP); Takashi Matsuda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 277 days.

(21) Appl. No.: 13/486,756

(22) Filed: Jun. 1, 2012

(65) Prior Publication Data

US 2012/0312965 A1    Dec. 13, 2012

(30) Foreign Application Priority Data

Jun. 8, 2011    (JP) .................... 2011-128144

(51) Int. Cl.
*H04N 5/341*    (2011.01)
*H04N 5/378*    (2011.01)

(52) U.S. Cl.
CPC .............. *H04N 5/341* (2013.01); *H04N 5/378* (2013.01)

(58) Field of Classification Search
USPC ........................................ 250/208.1
See application file for complete search history.

(56) References Cited

U.S. PATENT DOCUMENTS

| | | | | |
|---|---|---|---|---|
| 5,708,376 A * | 1/1998 | Ikeda | ............... | 327/50 |
| 5,892,540 A | 4/1999 | Kozlowski | | |
| 6,441,357 B2 * | 8/2002 | Ang et al. | .............. | 250/208.1 |
| 6,700,110 B2 * | 3/2004 | Mizuno et al. | ........... | 250/208.1 |
| 6,747,264 B2 * | 6/2004 | Miida | .............. | 250/214 AG |
| 6,956,607 B2 * | 10/2005 | Mizuno et al. | ............... | 348/308 |
| 6,977,682 B2 * | 12/2005 | Mizuno et al. | ............... | 348/241 |
| 7,173,230 B2 * | 2/2007 | Charbon | .................. | 250/214 A |
| 7,508,427 B2 * | 3/2009 | Choi | ............... | 348/241 |
| 7,612,815 B2 * | 11/2009 | Suzuki et al. | ................. | 348/302 |
| 7,812,876 B2 * | 10/2010 | Hiyama et al. | ............... | 348/300 |
| 2001/0017343 A1 * | 8/2001 | Ang et al. | .............. | 250/208.1 |
| 2004/0207739 A1 * | 10/2004 | Rossi | ............... | 348/300 |
| 2004/0239783 A1 * | 12/2004 | Imaizumi et al. | ............. | 348/255 |
| 2005/0024509 A1 * | 2/2005 | Itani et al. | ..................... | 348/255 |
| 2005/0068439 A1 * | 3/2005 | Kozlowski et al. | ........... | 348/308 |
| 2005/0168603 A1 * | 8/2005 | Hiyama et al. | ................. | 348/294 |
| 2006/0017827 A1 * | 1/2006 | Tani et al. | ..................... | 348/255 |
| 2006/0227229 A1 * | 10/2006 | Suzuki et al. | ................. | 348/294 |
| 2008/0006764 A1 * | 1/2008 | Boemler | ................... | 250/208.1 |
| 2008/0012741 A1 * | 1/2008 | Nakata et al. | ................. | 341/155 |
| 2008/0062296 A1 * | 3/2008 | Ogura et al. | ................. | 348/308 |
| 2008/0106338 A1 * | 5/2008 | Miyamoto et al. | ........... | 330/308 |
| 2008/0119154 A1 * | 5/2008 | Nam et al. | ................. | 455/253.2 |

(Continued)

FOREIGN PATENT DOCUMENTS

| | | |
|---|---|---|
| CN | 1645918 A | 7/2005 |
| CN | 1829293 A | 9/2006 |

(Continued)

*Primary Examiner* — Michael Osinski
(74) *Attorney, Agent, or Firm* — Canon USA, Inc. IP Division

(57) ABSTRACT

A solid-state image pickup device which includes, on a semiconductor substrate, an image pickup area which includes plural columns of pixels, and plural column amplifier circuits each provided at each column of pixels or at every plural columns of pixels, wherein: each of the column amplifier circuits includes at least two amplifier circuit stages; a preceding amplifier circuit is a variable-gain amplifier circuit and the switchable gains include plural one or more gains; and a subsequent amplifier circuit is capable of amplifying, at one or more gains, the signal amplified at one or more gains in the preceding amplifier circuit.

8 Claims, 9 Drawing Sheets

(56) References Cited

U.S. PATENT DOCUMENTS

| | | | |
|---|---|---|---|
| 2008/0252767 A1* | 10/2008 | Muramatsu et al. | 348/312 |
| 2009/0009642 A1* | 1/2009 | Joshi et al. | 348/301 |
| 2009/0086071 A1* | 4/2009 | Kagawa et al. | 348/300 |
| 2009/0195533 A1* | 8/2009 | Chen et al. | 345/214 |
| 2009/0295968 A1* | 12/2009 | Matsuda et al. | 348/308 |
| 2009/0295969 A1* | 12/2009 | Kondo | 348/308 |
| 2010/0271247 A1* | 10/2010 | Lee et al. | 341/155 |
| 2010/0314530 A1* | 12/2010 | Hiyama et al. | 250/208.1 |
| 2011/0101204 A1* | 5/2011 | Cieslinski | 250/208.1 |
| 2011/0134295 A1* | 6/2011 | Shigeta et al. | 348/300 |
| 2011/0194007 A1* | 8/2011 | Kim et al. | 348/308 |
| 2012/0119787 A1* | 5/2012 | Sakuragi | 327/50 |
| 2013/0057741 A1* | 3/2013 | Noda et al. | 348/300 |
| 2013/0075608 A1* | 3/2013 | Han et al. | 250/336.1 |
| 2013/0088625 A1* | 4/2013 | Iwata et al. | 348/300 |
| 2013/0187028 A1* | 7/2013 | Salvestrini et al. | 250/208.1 |
| 2013/0228673 A1* | 9/2013 | Hashimoto et al. | 250/208.1 |
| 2013/0325391 A1* | 12/2013 | Kwon et al. | 702/130 |

FOREIGN PATENT DOCUMENTS

| | | |
|---|---|---|
| JP | 2002-199292 A | 7/2002 |
| JP | 2006-295620 A | 10/2006 |
| JP | 2009-021920 A | 1/2009 |

* cited by examiner

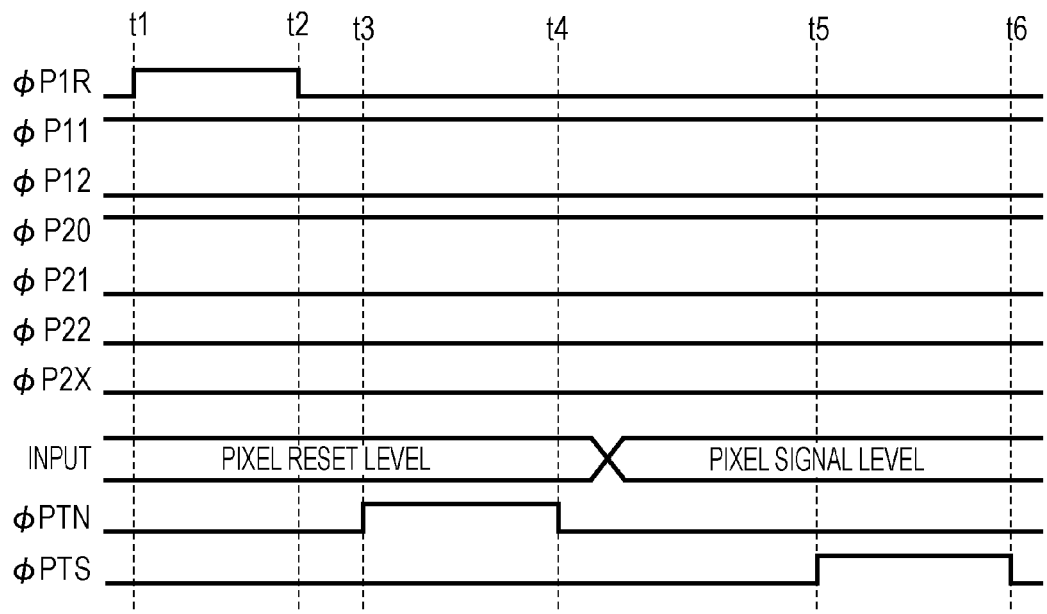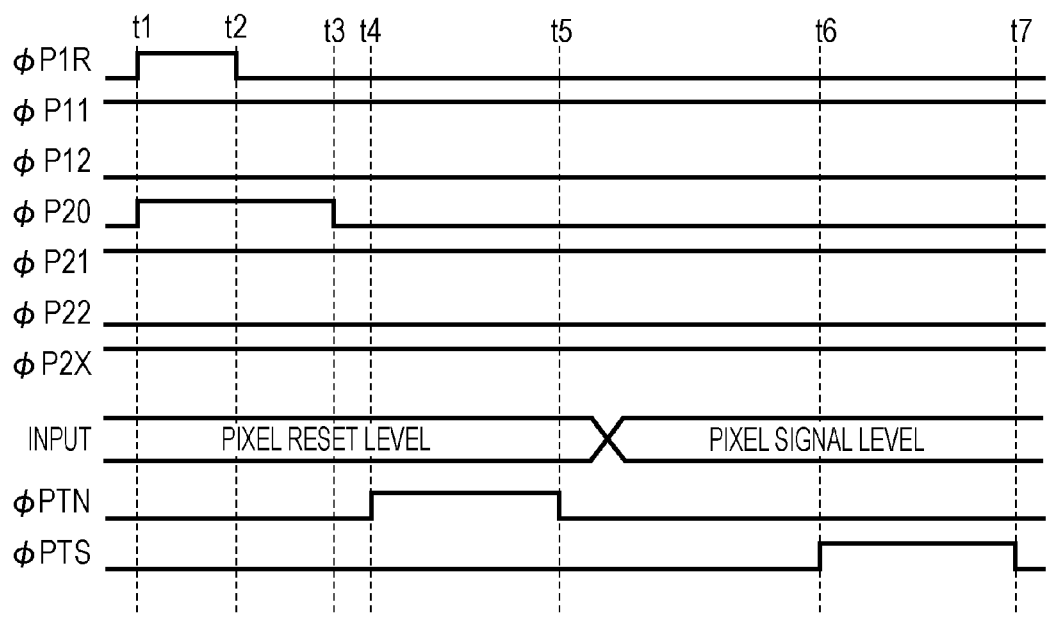

SOLID-STATE IMAGE PICKUP DEVICE AND METHOD OF DRIVING THE SAME

BACKGROUND OF THE INVENTION

1. Field of the Invention

One disclosed aspect of the embodiments relates to a solid-state image pickup device, and more particularly to an amplifier circuit which amplifies signals.

2. Description of the Related Art

In a typical solid-state image pickup device, pixels are arranged in a matrix form and constitute an image pickup area. An amplifier circuit is provided for each column of pixels or every plural columns of pixels. U.S. Pat. No. 5,892,540 discloses an exemplary configuration of a solid-state image pickup device. An amplifier circuit is provided in each column of pixels. The amplifier circuit is a two-stage column amplifier circuit consists of a preceding variable-gain amplifier circuit and a subsequent voltage follower amplifier.

In a solid-state image pickup device, it is required that a signal generated in a photoelectric converter is amplified at high gain as quickly as possible. This is because, if a signal is amplified at high gain before noise is superimposed on the signal, an S/N ratio is increased. Recently, therefore, it is required to amplify a signal at an even higher gain in the column amplifier circuit. In a configuration in which a gain is applied to a signal only at a preceding amplifier circuit and a subsequent amplifier circuit is used as a buffer, as in the device disclosed U.S. Pat. No. 5,892,540, there is a possibility that the preceding amplifier circuit has a complicated circuit configuration and is thus not received within a predetermined pixel pitch. In view of the aforementioned, one aspect of the embodiments enables amplification at high gain by a simple configuration in an amplifier circuit provided on, for example, a column of pixels.

SUMMARY OF THE INVENTION

One disclosed aspect of the embodiments is a solid-state image pickup device which includes, on a semiconductor substrate, an image pickup area which includes plural columns of pixels, and plural column amplifier circuits each provided at each column of pixels or at every plural columns of pixels, wherein: each of the column amplifier circuits includes at least two amplifier circuit stages; a preceding amplifier circuit is a variable-gain amplifier circuit and the switchable gains include plural one or more gains; and a subsequent amplifier circuit is capable of amplifying, at one or more gains, the signal amplified at one or more gains in the preceding amplifier circuit.

Further features of the embodiments will become apparent from the following description of exemplary embodiments with reference to the attached drawings.

BRIEF DESCRIPTION OF THE DRAWINGS

FIGS. 3A and 3B are driving pulse pattern diagrams of the first embodiment.

DESCRIPTION OF THE EMBODIMENTS

First Embodiment

Figure 1:
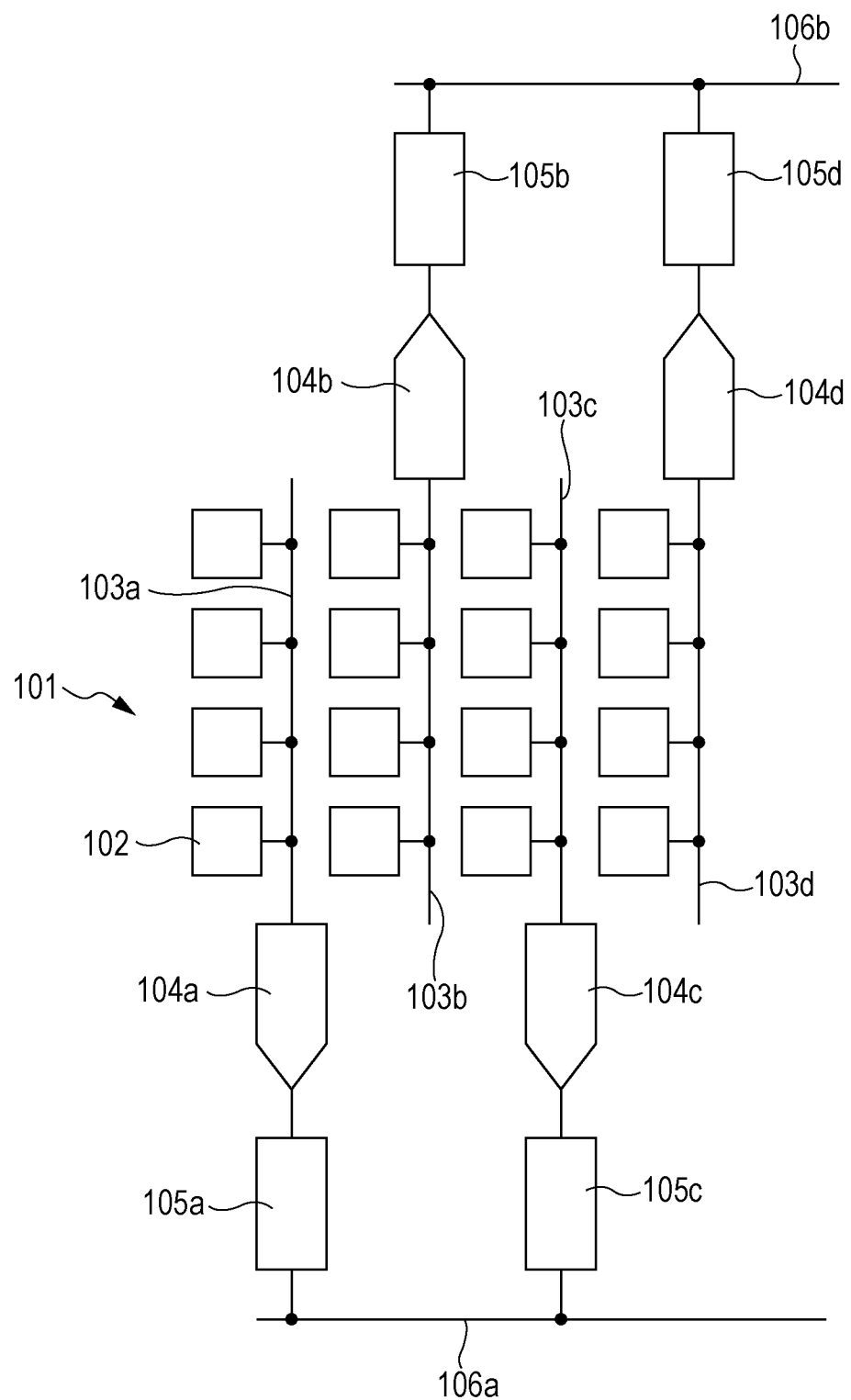
FIG. 1 is a conceptual diagram of a block diagram of an image pickup device according to one embodiment.

One disclosed feature of the embodiments may be described as a process which is usually depicted as a timing diagram, a structure diagram, or a block diagram. Although a timing diagram may describe the operations or events as a sequential process, the operations may be performed, or the events may occur, in parallel or concurrently. An operation in a timing diagram may be optional. In addition, the order of the operations or events may be re-arranged FIG. 1 is a block diagram of a solid-state image pickup device according to one embodiment. Pixels 102 are arranged in a matrix form in an image pickup area 101. An image pickup area consists of plural columns of pixels. Each of vertical signal lines 103a to 103d is provided in each column of pixels. Signals are read from each pixel column substantially simultaneously to corresponding one of the vertical signal lines 103a to 103d. In particular, the signals are read in parallel. Column amplifier circuits 104a to 104d are capable of amplifying signals output to the vertical signal lines 103a to 103d at two amplification stages. Sample/hold circuits 105a to 105d sample the signals amplified by the column amplifier circuits 104a to 104d. The signals retained by the sample/hold circuits 105a to 105d are output to horizontal output lines 106a and 106b successively or randomly in response to drive signals from an unillustrated horizontal scanning circuit. It is desirable that the circuits and blocks described above are mounted on the same single semiconductor substrate. At least the image pickup area 101 and the column amplifier circuits 104a to 104d need to be arranged on the same single semiconductor substrate. A column A/D conversion circuit may be provided subsequent to the column amplifier circuits 104a to 104d. The column A/D conversion circuit is also mounted on the same single semiconductor substrate. The column amplifier circuits 104a to 104d and the sample/hold circuits 105a to 105d may be referred to as a columns circuit. The columns circuit is capable of performing temporally parallel processing of the signals output in temporally parallel to the plural vertical signal lines.

Various pixel configurations may be employed. For example, the S/N ratio is increased desirably by using an APS sensor provided with a photoelectric converter and a pixel amplifier which amplifies signals generated in the photoelectric converter.

Figure 2:
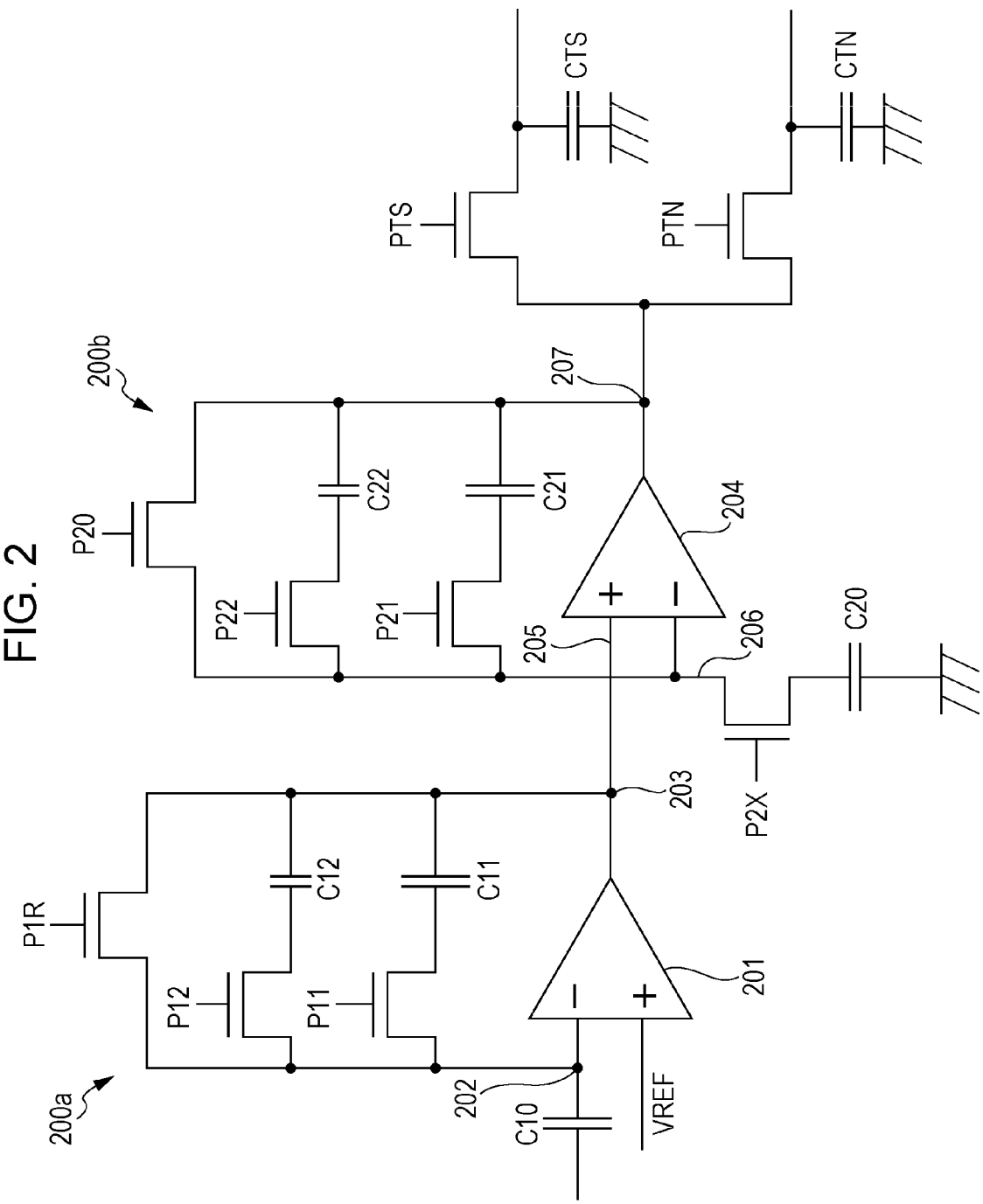
FIG. 2 is an equivalent circuit schematic diagram of a column amplifier circuit of a first embodiment.

FIG. 2 illustrates an example of an equivalent circuit schematic diagram of the column amplifier circuit. The entire column amplifier circuit is constituted by a preceding amplifier circuit 200a and a subsequent amplifier circuit 200b.

A vertical signal line 103 is electrically connected to an inverting input node 202 of an operational amplifier 201 via an input capacitance C10. A circuit which reduces reset noise of pixels using the input capacitance C10 as clamp capacitance may be build.

Predetermined reference voltage VREF is applied to a non-inverting input node. It is possible to provide a switch on an electric path between the input capacitance C10 and the vertical signal line 103 so that electrical conduction therebetween may be controlled. Plural feedback paths are provided in parallel on the electric path between the inverting input node 202 and the output node 203 of the operational amplifier 201. A switch P1R is provided in a first feedback path. The switch P1R is used to reset the operational amplifier 201. That is, the switch P1R is used to make the operational amplifier 201 perform a voltage follower operation. A second feedback path is provided with a switch P11 and first feedback capacitance C11. A third feedback path is provided with a switch P12 and second feedback capacitance C12. The first feedback capacitance C11 and the second feedback capacitance C12 differ from each other regarding capacitance value. Independent operations of the switches P11 and P12 may carry out amplification at different gains. Although two feedback capacities are provided in this example, the gain may be switched at even more stages by providing in parallel feedback capacities with different capacitance values. The preceding amplifier circuit may consist of such a configuration. In the preceding amplifier circuit, a variable-gain inverting amplifier circuit and a voltage follower circuit may be switched to each other.

Next, the subsequent amplifier circuit 200b will be described. A non-inverting input node 205 of an operational amplifier 204 is directly connected to an output node 203 of the preceding amplifier circuit 200a. That is, a signal of the preceding amplifier circuit 200a is received at the non-inverting input node 205. An inverting input node 206 is supplied with predetermined voltage via a switch P2X and capacitance C20. Ground potential is supplied in this example. Plural feedback paths are provided in parallel in an electric path between the inverting input node 206 and an output node 207 of the operational amplifier 204. A switch P20 is provided in a first feedback path. The switch P20 is used to reset the operational amplifier 204. The switch P20 is also used to make the operational amplifier 204 perform the voltage follower operation. A second feedback path is provided with a switch P21 and first feedback capacitance C21. A third feedback path is provided with a switch P22 and second feedback capacitance C22. The first feedback capacitance C21 and the second feedback capacitance C22 differ from each other regarding capacitance value. Independent operations of the switches P21 and P22 may carry out amplification at different gains. Although two feedback capacities are provided in this example, the gain may be switched at even more stages by providing in parallel feedback capacities with different capacitance values. A subsequent amplifier circuit 200b may consist of these configurations. In the subsequent amplifier circuit 200b, the variable-gain non-inverting amplifier circuit and a voltage follower circuit may be switched to each other.

In the present embodiment, the entire column amplifier circuit is constituted by a variable-gain inverting amplifier circuit and a variable-gain non-inverting amplifier circuit. Therefore, it is not necessary that the gain of each amplifier circuit is excessively high. An exemplary combination of the gains is as follows: if the gain is increased by 64 times in the preceding amplifier circuit 200a and by 4 times in the subsequent amplifier circuit 200b, the gain increased by 256 times may be obtained in the column amplifier circuit. Application of the gain which is increased by 256 times to only one stage of an amplifier circuit requires an increase in the circuit size. This may cause an increase in the size of each of the transistors constituting the amplifier circuit, and thereby power consumption becomes large. Further, difference in gains among each column amplifier circuit may become large. This is because it is necessary to create capacitance that is as small as 1/256 with respect to basic capacitance and the created capacitance is very vulnerable to fluctuation in production. A power-saving design may cause a decrease in cut-off frequency and response speed decreases significantly. This may adversely affect speeding up.

The following modes may be switched to each other: a mode in which the gains are applied to both the preceding amplifier circuit and the subsequent amplifier circuit; and a mode in which one or more gain is applied to the preceding amplifier circuit 200a and makes the subsequent amplifier circuit perform the voltage follower operation.

Switches PTN and PTS are sample/hold switches used to retain signals processed in the column amplifier circuit. The switch PTN is used to sample/hold an offset signal of the column amplifier circuit. The switch PTS is used to retain an optical signal on which the above-described offset signal is superimposed (hereinafter, "optical signal"). Sample/hold capacitance CTN retains the offset signal and sample/hold CTS retains the optical signal. An unillustrated switch may be provided subsequent to the sample/hold capacitance CTN and CTS and output is made to a horizontal output line. Alternatively, another sample/hold circuit may be provided in an electric path between the horizontal output line and the sample/hold capacitance CTN and CTS so as to reduce blanking period.

An example of driving pulse pattern of the solid-state image pickup device of the present embodiment is illustrated in FIGS. 3A and 3B. Each switch is conducting at high levels and non-conducting at low levels. A code of each pulse represents a driving pulse supplied to a controller of each switch.

FIG. 3A illustrates an example in which the preceding amplifier circuit 200a is made to operate at one or more gains and the subsequent amplifier circuit 200b is made to perform the voltage follower operation. FIG. 3B illustrates an example in which both the preceding amplifier circuit 200a and the subsequent amplifier circuit 200b are made to operate at one or more gains.

During the period illustrated in FIG. 3A, ϕP11 and ϕP20 are kept at high level and the switches P11 and P20 are kept in a conducting state. ϕP21 and ϕP22 are kept at low level and the switches P21 and P22 are kept in a non-conducting state. ϕP1R is kept at high level during a predetermined period and is kept at low level during the rest of the period. That is, the switch P1R is kept in the conducting state during a predetermined period and then kept in the non-conducting state. ϕP2 is kept at low level and the switch P2X is in a non-conducting state.

With such a driving pulse being supplied, the operation of the preceding amplifier circuit 200a is switched between the voltage follower operation and an inverting amplification operation on the basis of the ratio of the capacitance value of the feedback capacitance C11 and the input capacitance C10. The subsequent amplifier circuit 200b still carries out the voltage follower operation. That is, the subsequent amplifier circuit 200b does not carry out the non-inverting amplification operation at one or more gains.

The driving pulse of FIG. 3A will be described in detail. At time t1, ϕP1R makes the low-to-high transition. A node on the side of the vertical signal line 103 of the input capacitance C10 is supplied with a pixel reset level or a signal on the basis of a pixel reset level.

At time t2, ϕP1R makes the high-to-low transition. During time t1 to t2, the preceding amplifier circuit 200a performs the voltage follower operation. Then the preceding amplifier circuit 200a has an imaginary short-circuit state and the potential of the inverting input node 202 becomes VREF. Clamping with VREF as reference potential may remove or reduce reset noise of a pixel.

Next, at time t3, ϕPTN makes the low-to-high transition. Then, the switch CTN is in a conducting state and the offset signal in the column amplifier circuit is retained in the sample/hold capacitance CTN.

After ϕPTN makes the high-to-low transition at time t4, the node on the side of the vertical signal line 103 of the input capacitance C10 is supplied with a signal with an optical signal from a pixel or a signal obtained by, for example, amplifying an optical signal.

At time t5, ϕCTS makes the low-to-high transition and the optical signal processed by the column amplifier circuit is retained in the sample/hold capacitance CTS.

Next, an operation of FIG. 3B will be described. During the period illustrated in FIG. 3B, ϕP11, ϕP21 and ϕP2X are kept at high level and the switches P11, P21 and P2X are kept in a conducting state.

With such a driving pulse being supplied, the operation of the preceding amplifier circuit 200a is switched between the voltage follower operation and the inverting amplification operation at one or more gains on the basis of the ratio of the capacitance value of the feedback capacitance C11 and the input capacitance C10. The operation of the subsequent amplifier circuit 200b is switched between the voltage follower operation and the non-inverting amplification operation at one or more gains.

In particular, ϕP1R makes the low-to-high transition at time t1. Then ϕP20 makes the low-to-high transition.

Subsequently, ϕP1R makes the high-to-low transition at time t2 and ϕP20 makes the high-to-low transition at time t3. During time t1 to t2, both the preceding amplifier circuit 200a and the subsequent amplifier circuit 200b perform the voltage follower operation. During time t2 to t3, the preceding amplifier circuit 200a performs the inverting amplification operation at one or more gains and the subsequent amplifier circuit 200b performs the voltage follower operation.

During the period after time t3, the preceding amplifier circuit 200a performs the inverting amplification operation at one or more gains and the subsequent amplifier circuit 200b performs the non-inverting amplification operation at one or more gains. Although time t3 at which ϕP20 makes the high-to-low transition may be the same as t2 at which ϕP1R makes the high-to-low transition, time t3 is desirably after t2.

Next, ϕPTN makes the low-to-high transition in time t4. Then, the switch CTN is in a conducting state and the offset signal in the column amplifier circuit is retained in the sample/hold capacitance CTN.

After ϕPTN makes the high-to-low transition at time t5, the node on the side of the vertical signal line 103 of the input capacitance C10 is supplied with a signal with an optical signal from a pixel or a signal obtained by, for example, amplifying an optical signal. At time t6, ϕCTS makes the low-to-high transition and the optical signal processed by the column amplifier circuit is retained in the sample/hold capacitance CTS.

FIG. 3B illustrates a method of driving which includes a first amplification operation in which an input signal is amplified at one or more gains, and a second amplification operation in which a signal amplified in the first amplification operation is amplified at one or more gains. The method further includes a sample/hold operation in which the signal obtained after the second amplification operation is sampled/held. These operations so far are performed in parallel in plural columns. Although not illustrated in detail in FIGS. 3A and 3B, the method includes, after the sample/hold step, an output operation in which the signal obtained after the sample/hold operation is output successively or randomly to a horizontal output line.

More particularly, the first amplification operation includes an operation of inverting amplification. In the first amplification step, the voltage follower operation is performed during a period in which a reset signal is output from the column of pixels. During a period in which an optical signal is output from the column of pixels, inverting amplification of the input signal is performed at one or more gains. Similarly, in the second amplification step, the voltage follower operation is carried out during a period in which a reset signal is output, and non-inverting amplification at one or more gains of the signal amplified in the first operation is performed during a period in which the optical signal is output.

The difference between FIG. 3A and FIG. 3B is as follows: the preceding amplifier circuit 200a performs an inverting amplification operation at one or more gains during a period in which sampling/holding is performed in the sample/hold circuit; and the subsequent amplifier circuit 200b performs the voltage follower operation in FIG. 3A and performs the non-inverting amplification operation at one or more gains in FIG. 3B. According to the configuration of the present embodiment, the operation of FIG. 3A and the operation of FIG. 3B may be switched over. Further, the gain in each amplifier circuit may be switched over by switching the feedback capacitance when the amplifier circuit is operated at one or more gains.

Since cut-off frequency is relatively high when the preceding amplifier circuit 200a is operating at a low gain, auxiliary charging of load capacitance by the voltage follower operation in the subsequent amplifier circuit 200b may be unnecessary. In such a case, it is possible to activate an unillustrated path which short-circuits the input and the output of the subsequent amplifier circuit and directly charge the load capacitance using the preceding amplifier circuit 200a. Desirably, the subsequent amplifier circuit has sufficiently high impedance with respect to the signal path.

Second Embodiment

Figure 4:
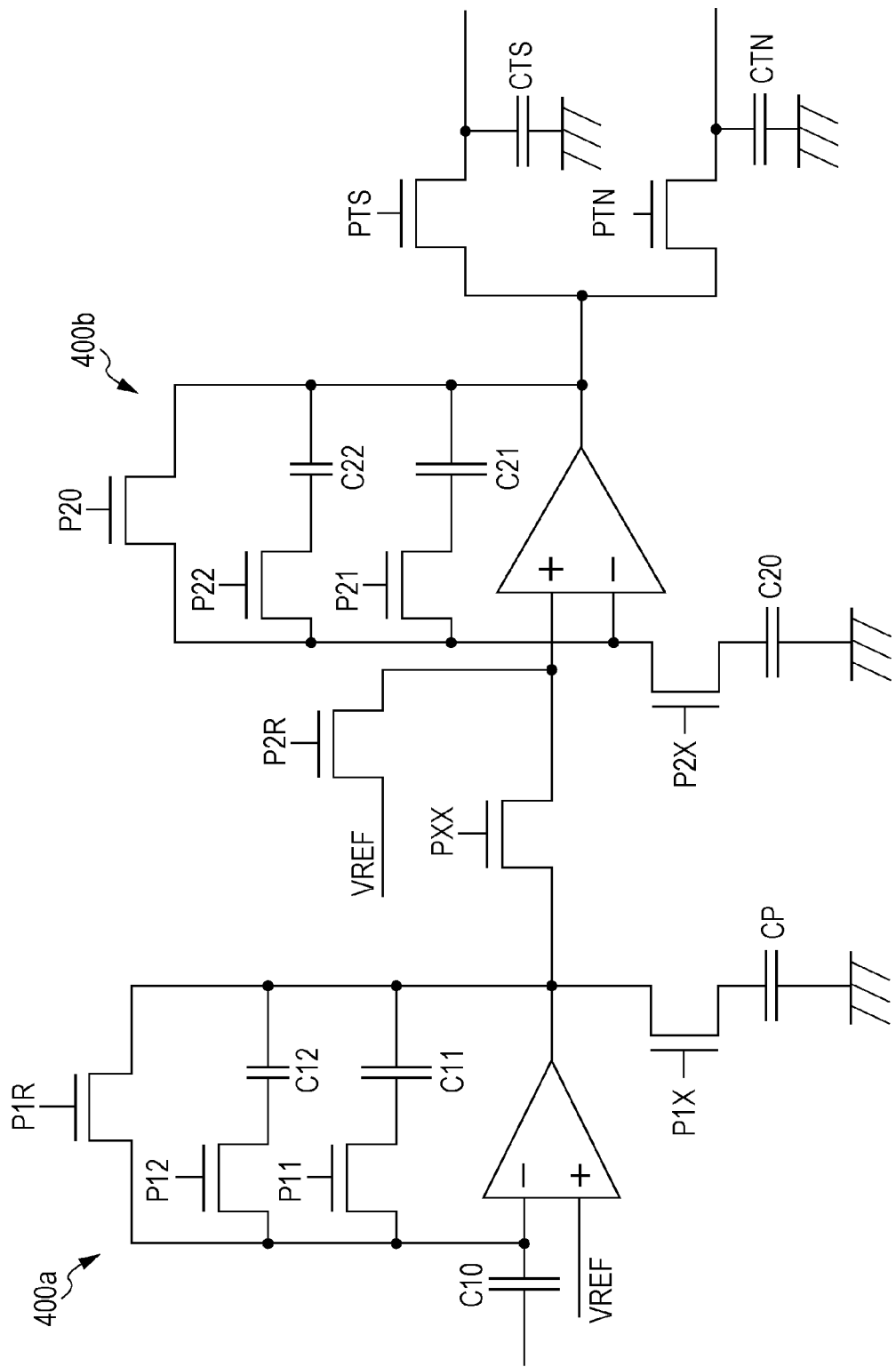
FIG. 4 is an equivalent circuit schematic diagram of a column amplifier circuit of a second embodiment.

An equivalent circuit schematic diagram of a column amplifier circuit of the present embodiment is illustrated in FIG. 4. Components having the same functions as those of the first embodiment are denoted by the same reference numerals and detailed description thereof is not given. The difference between the present embodiment and the first embodiment is that capacitance CP for phase compensation is provided, via a switch P1X, at an output node 403 of a preceding amplifier circuit 400a. The capacitance CP for phase compensation is supplied with predetermined potential at one of nodes thereof. The further difference is that a switch PX is provided in an electric path between an output node 403 of the preceding amplifier circuit 400a and a non-inverting input node 405 of a subsequent amplifier circuit 400b. The further difference is that reference potential VREF may be supplied via a switch P2X to the electric path between the switch PX and the non-inverting input node 405 of the subsequent amplifier circuit 400b.

An operation of the present embodiment will be described with reference to FIG. 5. During the period illustrated in FIG. 5, ϕP11, ϕP21, ϕP1X and ϕP2X are kept at high level. That is, the switches P11, P21, P1X and P2X are kept in the conducting state. At time t1, ϕP1, ϕP20 and ϕP2R make the low-to-high transition. ϕPX makes the high-to-low transition. Then, the preceding amplifier circuit 400a and the subsequent amplifier circuit 400b perform the voltage follower operation. The non-inverting input node 405 of the subsequent amplifier circuit 400b is compulsorily reset by the switch P2R, and then the output node 403 of the preceding amplifier circuit 400a and the non-inverting input node 405 of the subsequent amplifier circuit 400b are not connected electrically by the switch PX.

At time t2, φP20 makes the high-to-low transition. Thus, a switch P20 is in a non-conducting state. At time t3, φP1R makes the high-to-low transition. During time t1 to t2, both the preceding amplifier circuit 400a and the subsequent amplifier circuit 400b perform the voltage follower operation. During time t2 to t3, the preceding amplifier circuit 400a performs an inverting amplification operation at one or more gains and the subsequent amplifier circuit 400b performs the voltage follower operation.

In the period after time t3, the preceding amplifier circuit 400a performs the inverting amplification operation at one or more gains, and the subsequent amplifier circuit 400b performs the non-inverting amplification operation at one or more gains.

At time t4, φPX makes the low-to-high transition. φP2R makes the high-to-low transition. Then the output node 403 of the preceding amplifier circuit 400a and the non-inverting input node of the subsequent amplifier circuit 400b are electrically connected and are in a conducted state. When the switch P2R is in a non-conducting state, supply of the reference potential VREF to the non-inverting input node 405 of the subsequent amplifier circuit 400b stops. Next, φPTN makes the low-to-high transition in time t5. Then, the switch CTN is in a conducting state and the offset signal in the column amplifier circuit is retained in the sample/hold capacitance CTN.

After φPTN makes the high-to-low transition at time t6, the node on the side of the vertical signal line 103 of the input capacitance C10 is supplied with a signal with an optical signal from a pixel or a signal obtained by, for example, amplifying an optical signal. At time t7, φCTS makes the low-to-high transition and the optical signal processed by the column amplifier circuit is retained in the sample/hold capacitance CTS.

According to the present embodiment, the preceding amplifier circuit 400a and the subsequent amplifier circuit 400b may be reset independently. Reset time may be shortened by keeping φP1X at low level and resetting the preceding amplifier circuit 400a and the subsequent amplifier circuit 400b independently.

The preceding amplifier circuit 400a may be provided with phase compensation capacitance. A mode may be provided in which the subsequent amplifier circuit 400b constantly perform the voltage follower operation.

Third Embodiment

Figure 6:
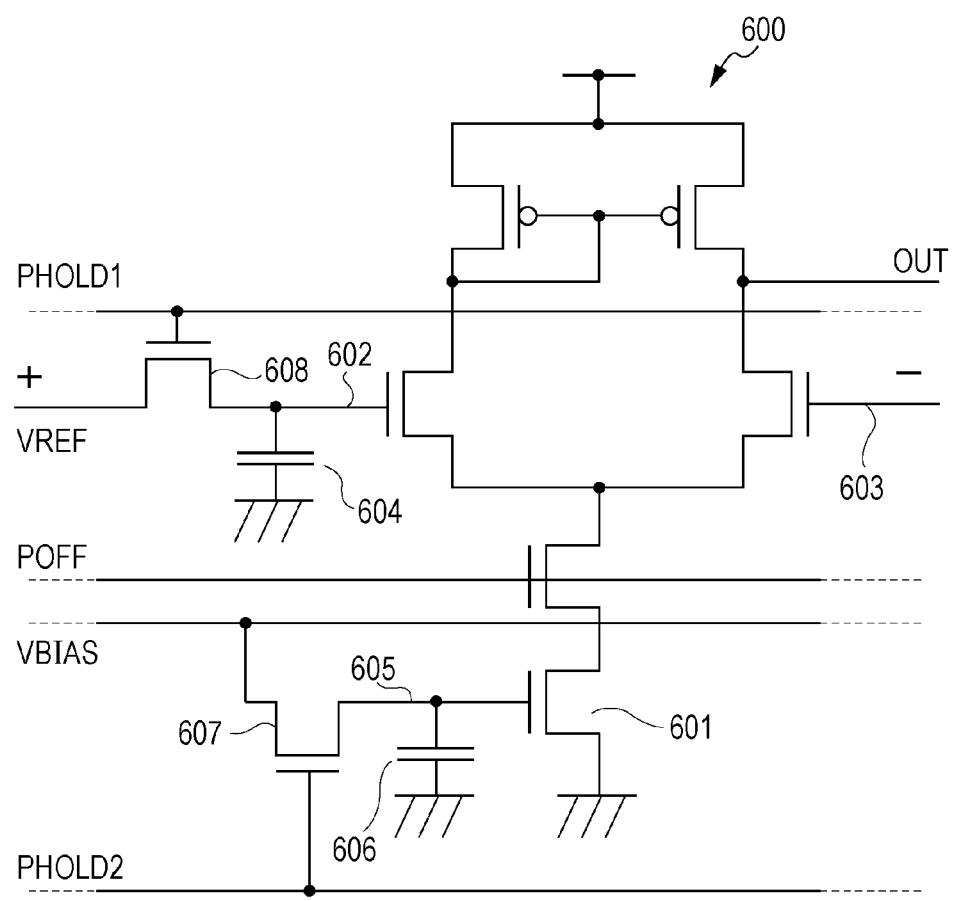
FIG. 6 is an equivalent circuit schematic diagram of an amplifier circuit of a third embodiment.

An exemplary equivalent circuit schematic diagram of an amplifier circuit of the present embodiment is illustrated in FIG. 6. The present embodiment has characteristics regarding the configurations of the preceding amplifier circuits described in the first and second embodiments. In particular, the non-inverting input node 602 of the amplifier circuit 600 is provided with a holding capacitance 604 for retaining reference potential VREF. Further, a gate 605 of a transistor 601 for supplying a bias current to the amplifier circuit 600 is provided with a holding capacitance 606 for retaining bias potential VBIAS. Switches 607 and 608 are used to retain potential at the holding capacitances 606 and 604, respectively. The switch 607 is controlled by a pulse supplied to wiring PHOLD2 and the switch 608 is controlled by PHOLD1. The inverting input node 603 is supplied with a signal from a pixel. The switch 609 is used to reduce power consumption and is controlled by a pulse supplied to wiring POFF.

Figure 5:
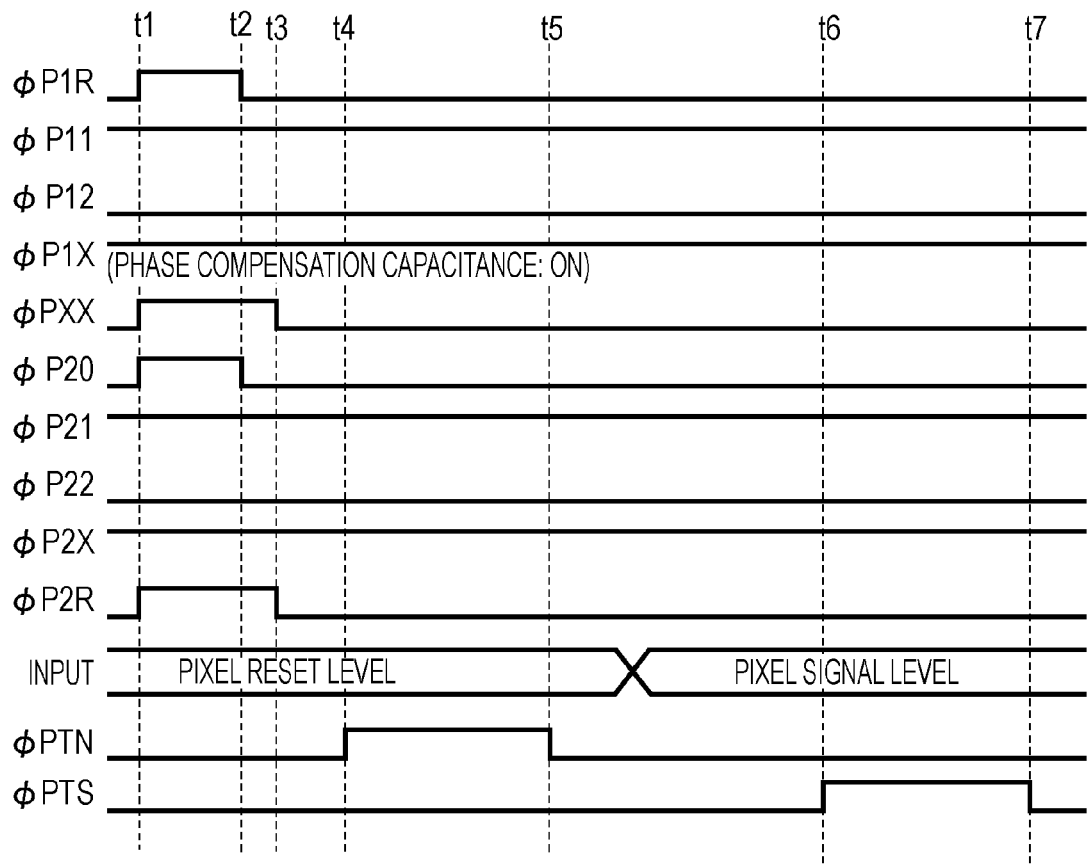
FIG. 5 is a driving pulse pattern diagram of the second embodiment.

Before the operations illustrated in FIGS. 3A, 3B and 5 are performed, the holding capacitances 602 and 604 may be operated with corresponding potential being sampled. With such a configuration, fluctuation in current in the amplifier circuit due to thermal noise superimposed on the bias potential VBIAS or due to noise caused by other crosstalk may be reduced. Fluctuation in current causes fluctuation in reference voltage for, for example, power supply and ground and, especially if the gain is, for example, as high as 256 times, the fluctuation in power supply is not ignorable. However, the above-described configuration may reduce the influence of the fluctuation in power supply. Although both the holding capacitances 602 and 604 are illustrated in FIG. 6, only either of them may be provided. The configuration illustrated by FIG. 6 may be a folded cascode amplifier circuit.

Fourth Embodiment

Figure 7:
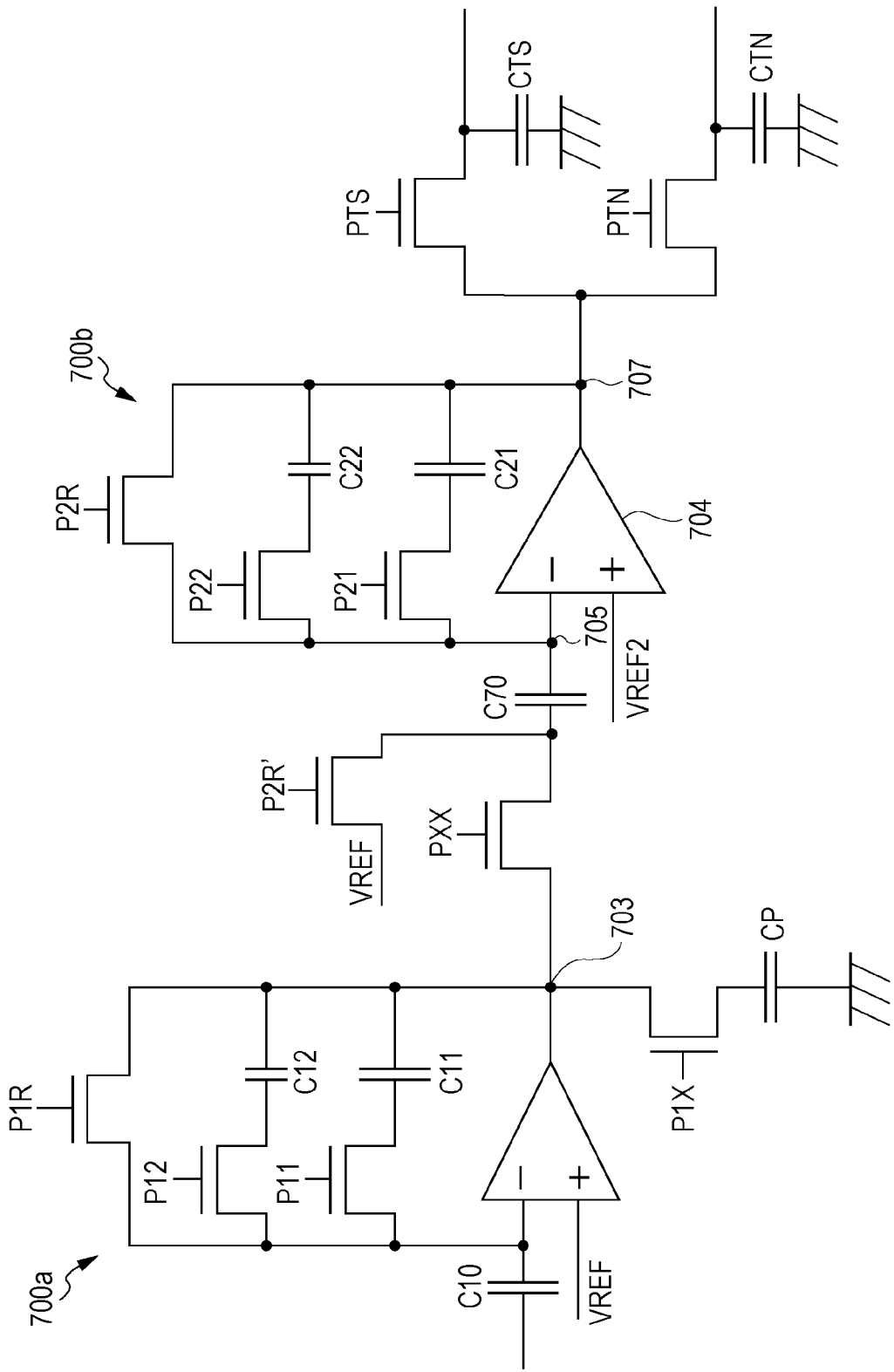
FIG. 7 is an equivalent circuit schematic diagram of column amplifier circuit of a fourth embodiment.

An equivalent circuit schematic diagram of a column amplifier circuit of the present embodiment is illustrated in FIG. 7. The column amplifier circuit of the present embodiment differs from that illustrated in FIG. 4 in that a subsequent amplifier circuit 700b is replaced by an inverting amplifier circuit.

A preceding amplifier circuit 700a has the same configuration as that illustrated in FIG. 2 or FIG. 4. Input capacitance C70 is disposed at an inverting input node of an operational amplifier 704 included in the subsequent amplifier circuit 700b. One of nodes of the input capacitance C70 is supplied with, via a switch PXX, a signal which has been amplified by the preceding amplifier circuit 700a.

Figure 8:
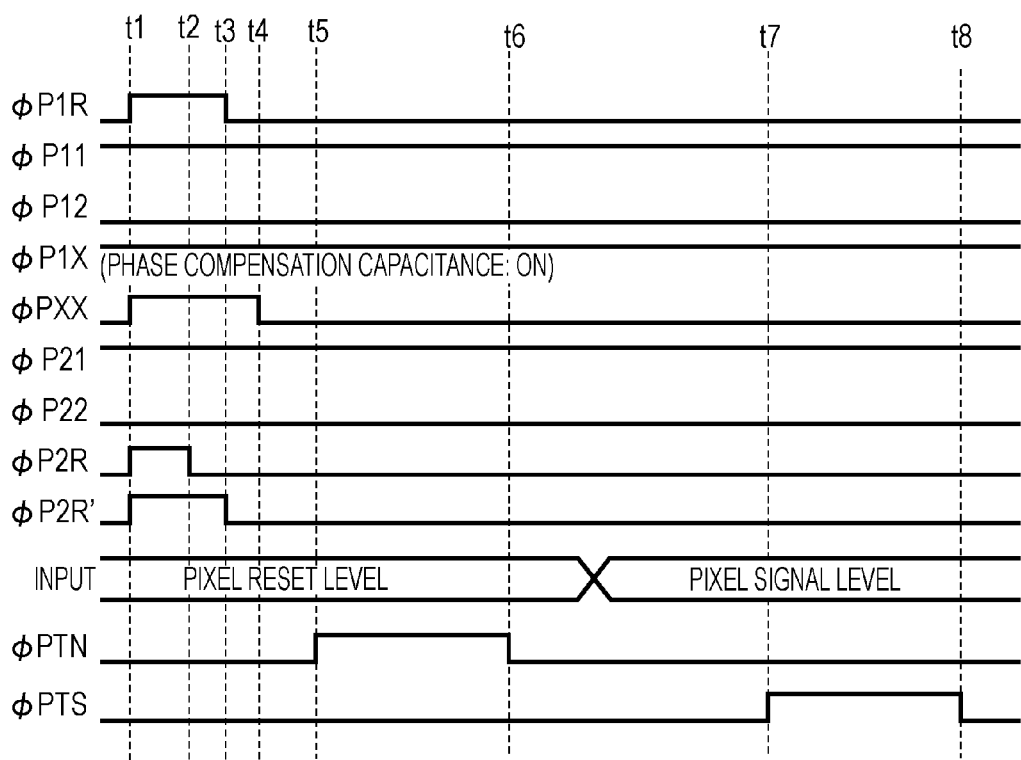
FIG. 8 is a driving pulse pattern diagram of the fourth embodiment.

A driving pulse pattern of the present embodiment is illustrated in FIG. 8. φP11, φP21 and φP1X are kept at high level during the period illustrated in FIG. 8. That is, the switches P11, P21 and P1X are kept in a conducting state. φP12 and φP22 are kept at low level. That is, the switches P12 and P22 are kept in the non-connecting state.

At time t1, φP1R, φP2R and φP2R' make the low-to-high transition. Then, corresponding switches are in the conducting state. φPXX makes the high-to-low transition and a corresponding switch is in the non-conducting state. The preceding and subsequent amplifier circuits perform the voltage follower operation.

At time t2, (φP2R makes the high-to-low transition. Then the subsequent amplifier circuit 700b is performing the inverting amplification operation at one or more gains.

φP1R and (φP2R' make a high-to-low transition at time t3. Then the preceding amplifier circuit 700a is performing the inverting amplification operation at one or more gains. Here, since a switch P2R' is in a non-conduction state, potential of a node of the input capacitance C70 on the side of the preceding amplifier circuit 700a is floating. A resetting operation of the subsequent amplifier circuit 700b is then released.

φPXX makes the low-to-high transition at time t4. Then, the switch PXX is in a conducting state and an output node of the preceding amplifier circuit 700a and an input node of the subsequent amplifier circuit 700b are electrically connected to each other.

φPTN makes the low-to-high transition at time t5 and makes the high-to-low transition at time t6.

φPTS makes the low-to-high transition at time t7 and makes the high-to-low transition at time t8.

With this operation, the preceding and subsequent amplifier circuits perform one or more inverting amplification operations. If the input of the operational amplifier included in the preceding amplifier circuit 700a is an N-channel MOS transistor, it is desirable that the input of the operational amplifier included in the subsequent amplifier circuit 700b employs a P-channel MOS transistor.

These embodiments are described regarding their characteristics and therefore may be changed suitably. As an exemplary operation method, in a mode in which a signal is read at a high gain, fluctuation of the amplifier circuit, e.g., fluctuation in ground potential, may mix in the own signal, and thus the gain may increase to produce noise. In such a case, it is desirable to hold all bias signals of a current source of a sensor during a period in which the reset signal and the optical signal from the pixel signal are sampled/held.

It is desirable to hold all the constant current sources of a repetitive columns circuit with large power consumption. Alternatively, it is desirable to hold all the bias signals of circuits (or columns circuits) that are active during a period in which at least the reset signal and the optical signal are sampled/held.

Description of Pixel Area

Figure 9:
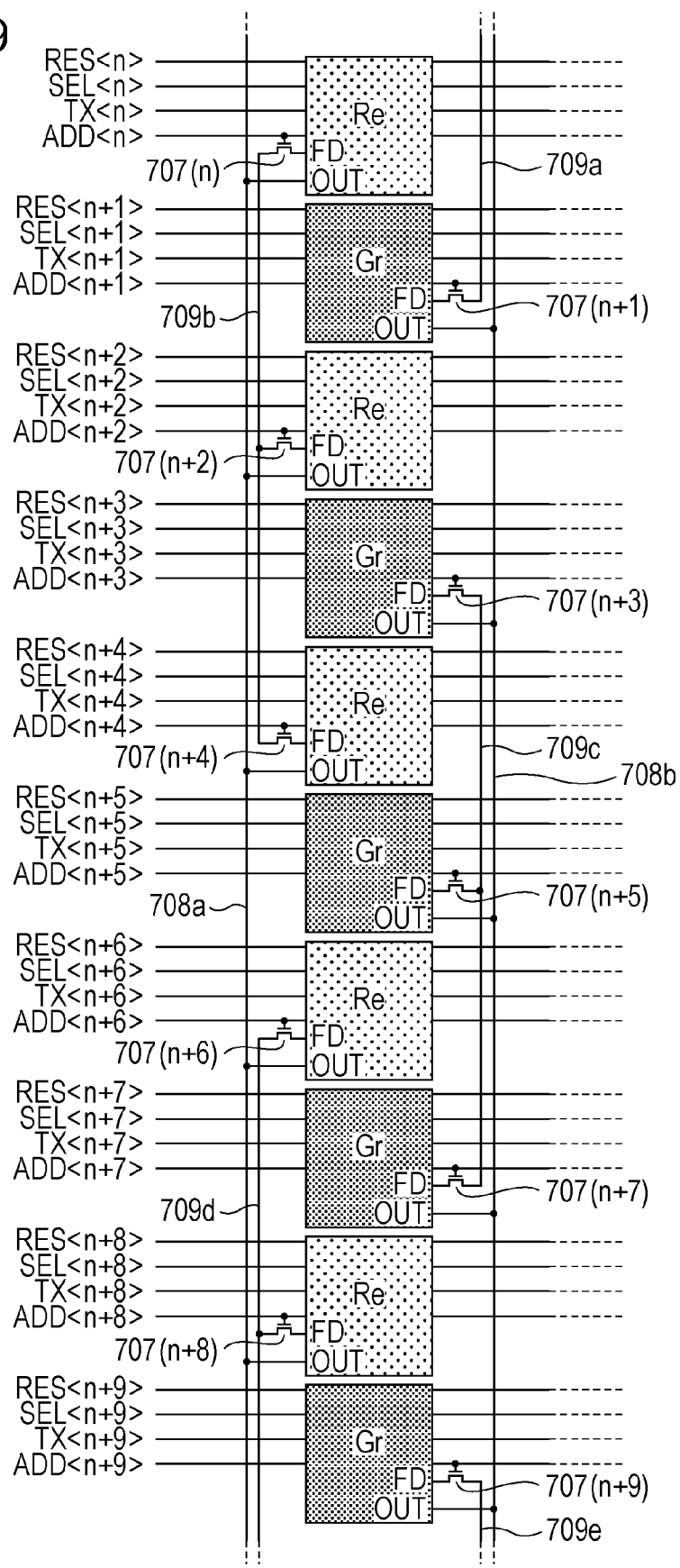
FIG. 9 is a conceptual diagram of a block diagram of an image pickup area applicable to one embodiment.

FIG. 9 is a pixel block diagram which is applicable to each embodiment of the disclosure. An image pickup area is constituted by pixels arranged in a matrix pattern. The image pickup area illustrated in FIG. 9 is constituted by 1 row and 10 columns. Although no pixel equivalent circuit is illustrated in FIG. 9, the pixel equivalent circuits illustrated in FIGS. 1 and 5 may be used. The image pickup device of the present embodiment is a color image pickup device. In the configuration illustrated in FIG. 9, green pixels Gr and red pixels Re are arranged in a repetitive manner. Such an arrangement is used as a part of a Bayer pattern. Components having the same functions as those of the first and second embodiments are denoted by the same reference numerals and detailed description thereof is not given.

"FD" in FIG. 9 denotes a node to be connected to an FD of each pixel, and "OUT" denotes an output node of each pixel. In the correspondence with the configuration of FIG. 1, the FD is a read-out node through which electric charge of the photoelectric converter is transferred, and the OUT is an output node of a selector. This configuration differs from those of the first and second embodiments in that plural signal lines are provided in each pixel row. Two signal lines are provided in a single pixel row in the configuration of FIG. 9.

Switches 707(n), 707(n+2) and 707(n+4) may electrically connect the FDs of nth, (n+2)th and (n+4)th pixels to one another via common bypass wiring 709b. Switches 707(n+3), 707(n+5) and 707(n+7) may electrically connect the FDs of (n+3)th, (n+5)th and (n+7)th pixels to one another via common bypass wiring 709c. The bypass wiring 709b and 709d which electrically connect the FDs of the red pixels are disposed close to a signal line 708a to which signals of the red pixels are read. Bypass wiring 709a, 709c and 709e which electrically connect the FDs of the green pixels are disposed close to a signal line 708b to which signals from the green pixels are output. In particular, the distance between the bypass wiring which connects the FDs of the pixels of a first color and the signal line to which the signals of the pixels of a second color is read is longer than the distance between the bypass wiring which connects the FDs of the pixels of the first color and the signal line to which the signals of the pixel of the first color is read. This configuration may reduce color mixture caused via capacitance between wiring. The amplifier of the pixel is desirably a non-inverting amplifier, such as a source follower circuit, because the direction in which potential of the signal line changes and the direction in which potential of the bypass wiring correspond to each other.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2011-128144 filed Jun. 8, 2011, which is hereby incorporated by reference herein in its entirety.

What is claimed is:

1. A solid-state image pickup device comprising an image pickup area, on a semiconductor substrate, which includes plural columns of pixels, and plural column amplifier circuits each provided at each column of pixels or at every plural columns of pixels, wherein:
the pixel outputs a signal,
each of the column amplifier circuits includes at least two amplifier circuit stages;
a preceding amplifier circuit has an inverting input node and an output node, and is configured to output a first amplified signal from the output node, wherein the first amplified signal is a signal in which the signal output from the pixel is input in the inverting input node, and amplified in a first gain selected from variable-gains having one or more values,
a subsequent amplifier circuit has a non-inverting input node, an inverting node and an output node, and is configured to output a second amplified signal from the output node, wherein the second amplified signal is a signal in which the first amplified signal output from the preceding amplifier circuit is input in the non-inverting input node of the subsequent amplifier circuit, and amplified in a second gain selected from variable gains having one or more values; and
while the output node and the inverting input node of the preceding amplifier circuit are connected, a reference potential is supplied to the non-inverting input node of the subsequent amplifier circuit, and the output node and the inverting input node of the subsequent amplifier circuit are connected.

2. The solid-state image pickup device according to claim 1, wherein the preceding amplifier circuit performs inverting amplification and the subsequent amplifier circuit performs non-inverting amplification.

3. The solid-state image pickup device according to claim 1, wherein the subsequent amplifier circuit switchingly performs a non-inverting amplification operation and the voltage follower operation.

4. The solid-state image pickup device according to claim 1, wherein plural vertical signal lines are provided to the column of pixels, and each column amplifier circuit is provided to correspond to each of the vertical signal lines.

5. The solid-state image pickup device according to claim 4, wherein the column of pixels includes a pixel of first color and a pixel of second color which is different from the first color, and each of the column amplifier circuits provided in each of the vertical signal lines amplifies either a signal from the pixel of first color or a signal from the pixel of second color.

6. The solid-state image pickup device according to claim 1, wherein:
the inverting input node of the preceding amplifier circuit receives the signal output from the pixel via input capacitance;
a non-inverting input node of the preceding amplifier circuit receives a reference potential; and the non-inverting input node of the preceding amplifier circuit includes holding capacitance which retains the reference potential.

7. The solid-state image pickup device according to claim 1, further comprising a transistor which supplies a bias current to the preceding amplifier circuit, and a gate of the transistor is provided with holding capacitance which retains reference potential supplied to the gate.

8. The solid-state image pickup device according to claim 1,
wherein while the output node and the inverting input node of the subsequent amplifier circuit are connected, a capacitance is connected to the inverting input node of the subsequent amplifying circuit.

* * * * *